US006868412B2

(12) United States Patent
Gatehouse et al.

(10) Patent No.: US 6,868,412 B2
(45) Date of Patent: Mar. 15, 2005

(54) MEANS FOR AND METHOD OF DISPLAYING A VISUAL DECISION TREE MODEL

(75) Inventors: Monty Gatehouse, Basingstoke (GB); Hendrik J. Schipper, Alkmaar (NL); Ian P. Buxton, Herts (GB)

(73) Assignee: NCR Corporation, Dayton, OH (US)

( * ) Notice: Subject to any disclaimer, the term of this patent is extended or adjusted under 35 U.S.C. 154(b) by 457 days.

(21) Appl. No.: 09/885,515

(22) Filed: Jun. 20, 2001

(65) Prior Publication Data

US 2002/0049688 A1 Apr. 25, 2002

(30) Foreign Application Priority Data

Jun. 24, 2000 (GB) .............................................. 0015404

(51) Int. Cl.⁷ ........................... G08F 17/00; G06G 5/02; G06G 5/00
(52) U.S. Cl. ........................... 706/62; 706/46; 345/595; 345/763
(58) Field of Search ............................... 706/59, 62, 60, 706/61, 45, 46, 50, 53, 919, 925; 707/102, 2; 345/594, 595, 621, 700, 763, 771, 781, 835; 715/530

(56) References Cited

U.S. PATENT DOCUMENTS

| | | | | |
|---|---|---|---|---|
| 5,251,125 A | | 10/1993 | Karnowski et al. ........... 700/84 |
| 5,495,567 A | * | 2/1996 | Iizawa et al. ............... 345/762 |
| 5,583,758 A | * | 12/1996 | McIlroy et al. ................ 705/2 |
| 5,623,613 A | | 4/1997 | Rowe et al. ................ 345/841 |
| 5,704,051 A | | 12/1997 | Lane et al. .................. 345/855 |
| 5,754,738 A | * | 5/1998 | Saucedo et al. .............. 706/11 |
| 5,768,581 A | * | 6/1998 | Cochran ........................ 707/5 |
| 5,822,587 A | * | 10/1998 | McDonald et al. ......... 717/108 |
| 5,933,140 A | | 8/1999 | Strahorn et al. ............. 345/712 |
| 5,933,704 A | * | 8/1999 | Hwang et al. ................ 438/14 |
| 5,987,247 A | * | 11/1999 | Lau ............................. 717/100 |
| 5,995,979 A | * | 11/1999 | Cochran ................... 707/104.1 |
| 6,023,578 A | * | 2/2000 | Birsan et al. ............... 717/105 |
| 6,091,893 A | * | 7/2000 | Fintel et al. ................... 703/6 |
| 6,151,565 A | * | 11/2000 | Lobley et al. ................. 703/2 |
| 6,269,355 B1 | * | 7/2001 | Grimse et al. ................ 706/46 |
| 6,314,415 B1 | * | 11/2001 | Mukherjee .................... 706/47 |
| 6,324,536 B1 | * | 11/2001 | Rofrano ........................ 707/5 |
| 6,327,586 B1 | * | 12/2001 | Kisiel ............................ 707/2 |
| 6,343,265 B1 | * | 1/2002 | Glebov et al. ............... 703/25 |
| 6,353,817 B1 | * | 3/2002 | Jacobs et al. ................ 706/50 |
| 6,430,545 B1 | * | 8/2002 | Honarvar et al. ............. 706/47 |
| 6,631,361 B1 | * | 10/2003 | O'Flaherty et al. ........... 706/47 |
| 2001/0011260 A1 | * | 8/2001 | Skaanning et al. ........... 706/46 |
| 2001/0047355 A1 | * | 11/2001 | Anwar ........................... 707/5 |

(List continued on next page.)

OTHER PUBLICATIONS

Santha, M., "On the Monte Carlo Boolean Decision Tree Complexity of Read–Once Formulae", Proceedings of the 6th Annual Structure in Complexity Theory Conference, Jul. 1991, pp. 180–187.*

(List continued on next page.)

*Primary Examiner*—Anthony Knight
*Assistant Examiner*—Kelvin Booker
(74) *Attorney, Agent, or Firm*—Priest & Goldstein PLLC

(57) ABSTRACT

A computer implemented means for and method of displaying a visual decision tree model in a symbol-based table is disclosed. This visual model includes a plurality of visual objects each of the visual objects being linked to at least one other object to form a decision tree. The invention is characterized in that after the initial object the tree displays only visual objects that depend from objects which have been selected by a user. Thus, the device displays only the path selected.

5 Claims, 3 Drawing Sheets

U.S. PATENT DOCUMENTS

| | | | |
|---|---|---|---|
| 2002/0019971 A1 * | 2/2002 | Zygmont et al. | 717/1 |
| 2002/0023064 A1 * | 2/2002 | Grimse et al. | 706/19 |
| 2002/0065856 A1 * | 5/2002 | Kisiel | 707/530 |
| 2002/0107824 A1 * | 8/2002 | Ahmed | 706/46 |
| 2003/0065635 A1 * | 4/2003 | Sahami et al. | 706/48 |
| 2003/0172043 A1 * | 9/2003 | Guyon et al. | 706/48 |

OTHER PUBLICATIONS

Ben–Asher et al., "Decision Trees with AND, OR Queries", Proceedings of the 10th Annual IEEE Structure in Complexity Theor Conference, Jun. 1995, pp. 74–81.*

Hajnal, P., "On Power of Randomness in the Decision Tree Model", Proceedings of the 5th Annual Structure in Complexity Theory Conference, Jul. 1990, pp. 66–77.*

Lovasz et al., "Search Problems in the Decision Tree Model", 32nd Annual Symposium on Foundations in Computer Science, Oct. 1991, pp. 576–585.*

MacArthur et al., "Relevance Feedback Decision Trees in Content–Based Image Retrieval", IEEE Workshop on Content–Based Access of Image and Video Libraries, Jun. 12, 2000.*

Holmes et al., "A Diagnostic Tool for Tree Based Supervised Classification Learning Algorithms", 6th International Conference on Neural Information Processing, Nov. 1999, vol. 2.*

Hall et al., "Decision Tree Learning on Very Large Data Sets", 1998 IEEE International Conference on Systems, man and Cybernetics, Oct. 1998, vol. 3, pp. 2579–2584.*

Khoshgoftaar et al., "A Tree–Based Classification Model for Analysis of a Military Software System", Proceedings of the IEEE High–Assurance Systems Engineering Workshop, Oct. 1996, pp. 244–251.*

Dillon et al., "Risk of Extreme Events Via Multiobjective Decision Trees: Application to Telecommunications", IEEE Transaction on Systems, Man and Cybernetics—Part A: Systems and Humans, vol. 26, No 2, Mar. 1996.*

Demsar et al., "Using Machine Learning for Content–Based Image Retrieval", Proceedings of the 13th International Conference on Pattern Recognition, Aug. 1996, vol. 4, pp. 138–142.*

Boekelder et al., "Selecting and Switching: Some Advantages of Diagrams Over Tables and Lists for Presenting Instructions", IEEE Transactions on Professional Communication, vol. 41, No 4, Dec. 1998.*

Li et al., "Investment Decision Making Using FGP: A Case Study", Proceedings of the 1999 Congress on Evolutionary Computation, Jul. 1999, vol. 2.*

* cited by examiner

MEANS FOR AND METHOD OF DISPLAYING A VISUAL DECISION TREE MODEL

BACKGROUND OF THE INVENTION

The present invention relates to a means for and method of displaying a visual decision tree model.

A decision tree is a logical pathway of steps involved in considering the input necessary to make a decision. Often, information necessary to make a truly informed decision will come from a host of different people from different commercial disciplines. Some information may come from within and some from outside of a company.

The decision tree model (which is created by a graphical-based or symbol-based tool) is a very effective way to present and communicate the resulting deliverable. Decision trees can be modelled using tools such as the METIS Object Oriented Visual Modelling tool, sold by Computas Ltd.

Clearly, in real commercial decision making, the options available can be numerous. Consequently, a decision tree can become extremely complex very quickly. This complexity can make the use of such systems less intuitive and consequently less useful in the decision making process.

The present invention addresses this problem and in particular aids a user to cope with the complexity of decision taking found in today's distributed and ever increasingly global organizations. The means and method in accordance with the present invention also enables managers to communicate, distribute and share their decision taking across the Internet.

SUMMARY OF THE INVENTION

According to a first aspect of the present invention, there is provided a computer implemented means for displaying a visual decision tree model in a symbol based table the visual decision tree model including a plurality of visual objects each of the visual objects being linked to at least one other object to form a decision tree, characterized in that, after the initial object, the tree displays only visual objects which depend from objects which have been selected by a user.

According to a second aspect of the present invention, there is provided a computer implemented method of displaying a visual architecture model in a symbol based table, the visual architecture model including a plurality of visual objects each of the visual objects being linked to at least one other object to form a decision tree, characterized in that after the initial object the tree displays only visual objects which depend from objects which have been selected by a user.

The decision tree model gradually exposes to the user the step by step decisions to be taken at each level in the tree. Furthermore, the model assists in the decision making process by prompting the users with issues to be considered and questions to be answered at each level within the structure. Having made this selection, the model then identifies the Cost Risks and Work involved resulting from the decisions taken.

The Decision Tree Methodology is a commonly used management technique and it is not this methodology but its application within a visual-modelling tool that is new and unique.

Preferably, decision based information is provided to the user through browser buttons at each level within the tree.

Most preferably, the information includes concepts which the user should consider prior to making the decision.

Alternatively, the information includes questions, which the user should ask prior to making the decision.

Still further, the information includes answers to those questions which have been put forward by other users.

Preferably, once the final object in the tree is presented consequences of that choice are presented to the user.

Most preferably, the consequences include cost implications of the choice.

Alternatively, the consequences include workload implications of the choice.

Alternatively, the consequences include risk analysis of the choice.

BRIEF DESCRIPTION OF THE DRAWINGS

An embodiment of the present invention will now be described, by way of example, with reference to the accompanying drawings, in which.

DETAILED DESCRIPTION

Figure 1:
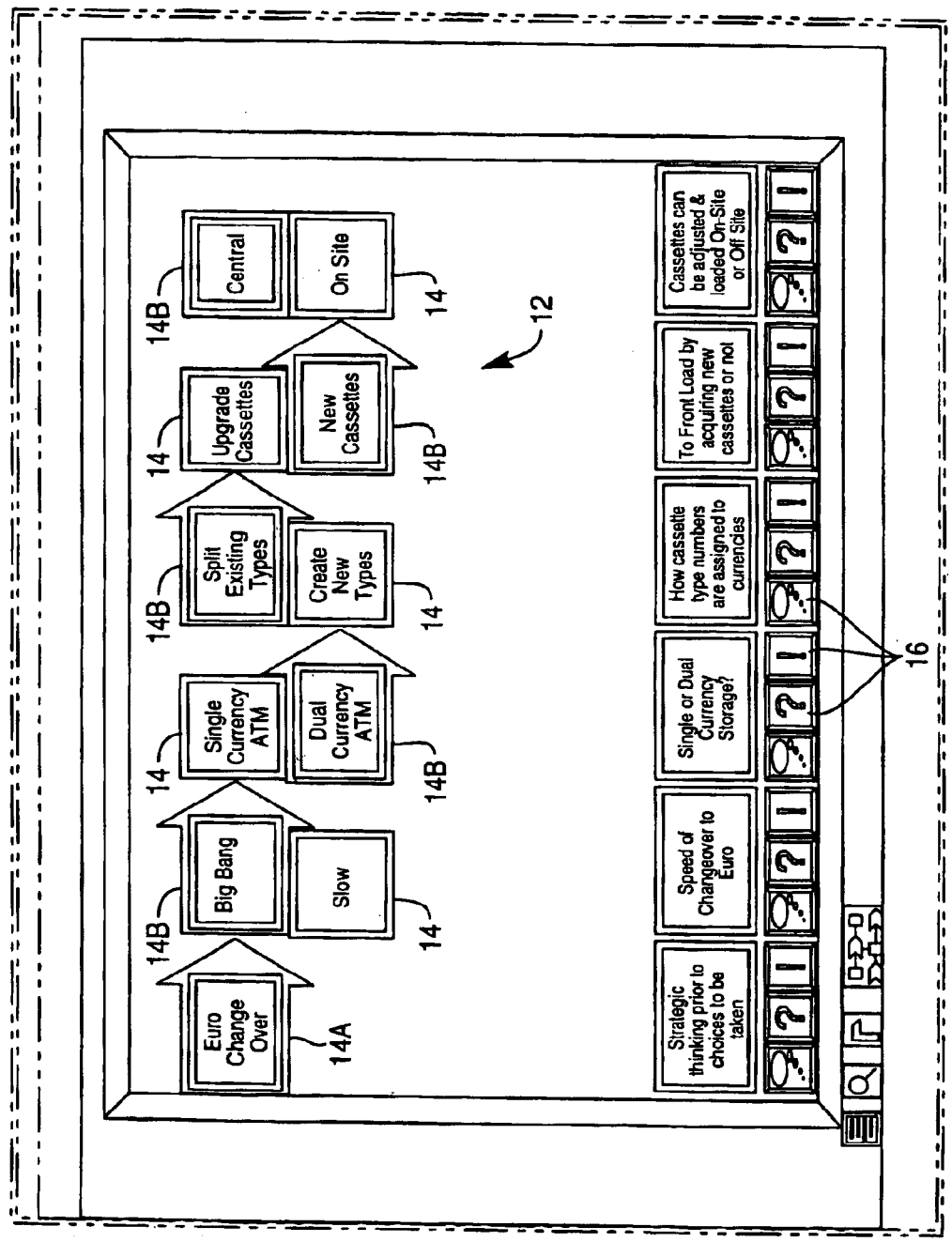
FIG. 1 illustrates a user interface display, displaying a first decision tree in accordance with the present invention.
Figure 2:
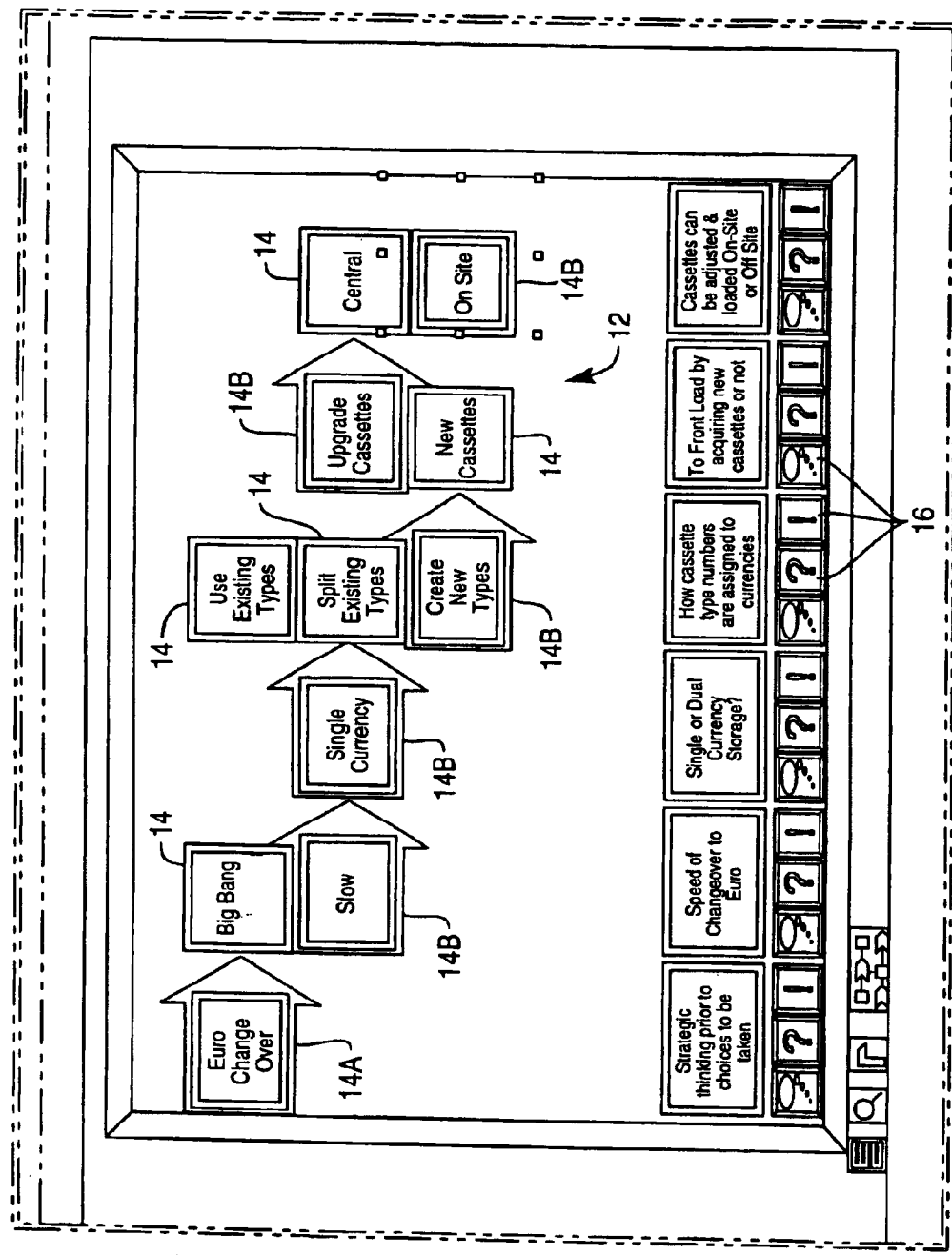
FIG. 2 illustrates a user interface display, displaying a second decision tree in accordance with the present invention.

FIG. 1 illustrates a user interface display 10 of an object oriented visual modelling tool, such as the METIS tool provided by Computas Ltd, operating in accordance with the present invention.

The display 10 indicates a decision tree 12, which is being utilized to formulate decisions regarding the introduction of the Euro currency by a financial institution. The tree 12 includes a plurality of visual objects 14 each of which are linked to at least one other object 14 to form the decision tree 12. After the initial object 14A, the tree 12 displays only visual objects 14 which depend from objects 14B, which have been selected by a user. As the user works through the tree the branches of the tree which would depend from objects 14, which have not been selected are not shown. This approach leads away from the trend in the field in which as much information as possible is provided to a user in order to make decisions. Instead, a gradual release of information is used in the method and means in accordance with the present invention.

Figure 3:
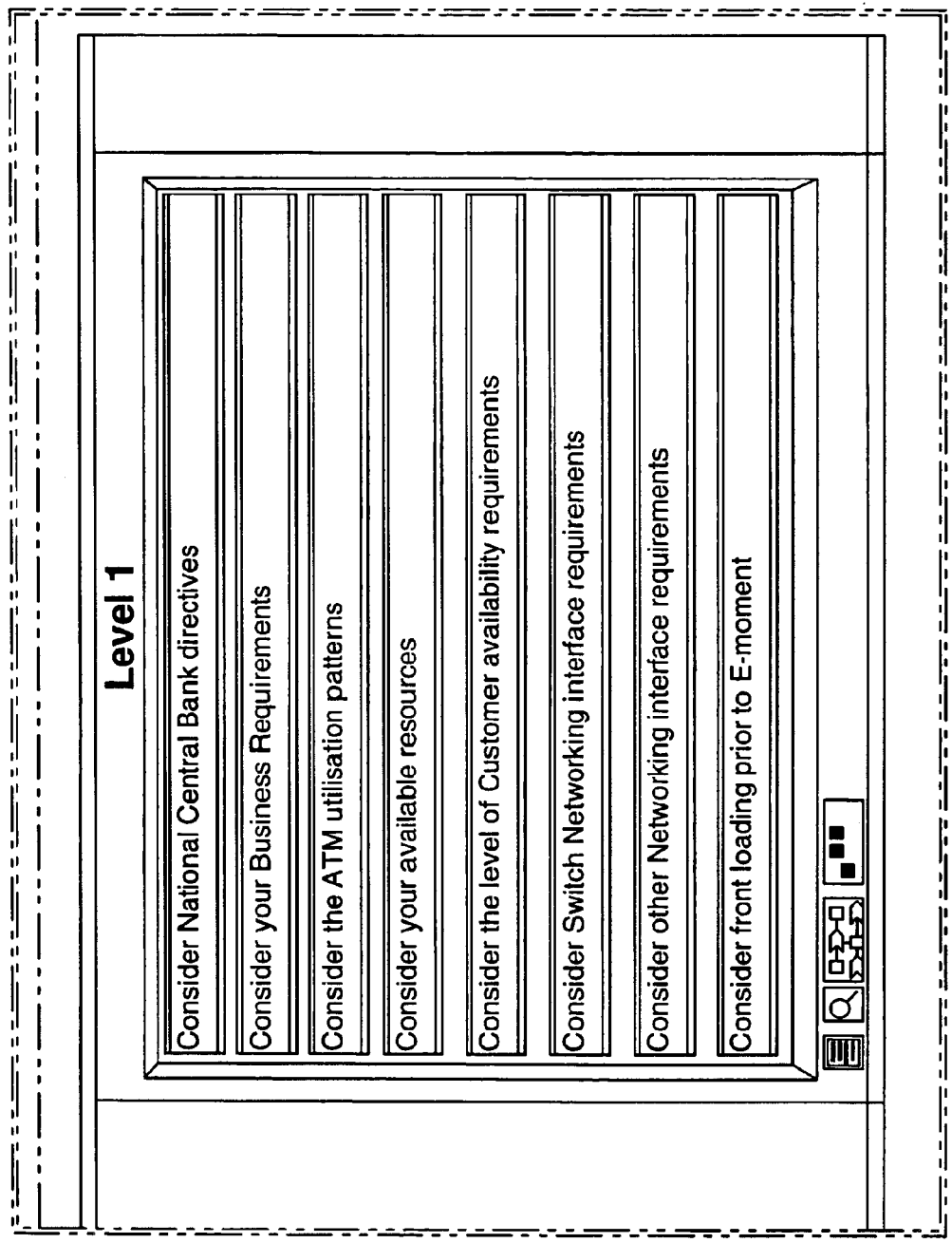
FIG. 3 illustrates the user interface of FIGS. 1 and 2 displaying a list of CONSIDERATIONS to be thought about before making a considered choice.

At this stage, the viewer should note that the current decision tree if and when fully displayed has 32 paths in all. However, only the selected path is shown. Information is provided to the user through browser buttons 16 once the user has been provided with a choice between, at least, two options. In the present embodiment the considerations in question are detailed in FIG. 3 and include:

Consider any relevant National Central Bank directives or policies;

Consider your business requirements;

Consider the Automated Teller Machine (ATM) utilization pattern for the market in question;

Consider available resources;

Consider the level of customer availability requirements;

Consider switch networking interface requirements;

Consider other networking interface requirements; and

Consider front loading prior to E-moment.

Accordingly, if a user is faced with the question "Big Bang or phased deployment" he or she should consider the relevant topics above including the national Central Bank directives and our resources to meet the choice made. In the example illustrated in FIG. 1 "Big Bang" was selected. This choice means a rapid deployment. However, a slow deployment may be appropriate in other territories or markets.

Alternatively or additionally, the information may include questions, which the user should ask prior to making the decision. For simplicity, no such questions are illustrated. However, they may include questions, which help with the aforementioned considerations in order to focus all user's minds on the same topics, so that each user makes decisions based on the same criteria. Answers to those questions, which have been put forward by other users, may also be available to a user to assist in the decision making process.

Thus, a user will work his or her way through the tree until they come to a final object. Once the final object in the tree is presented, consequences of that choice may be presented to the user. For example, the user may be informed of cost implications of the choice. Alternatively or additionally, the users may be informed of workload implications of the choice. This information will assist in personnel management issues resulting from the choice. Alternatively or additionally, a risk analysis of the choice may be provided.

While the invention has been illustrated and described in detail in the drawing and foregoing description, it should be understood that the invention may be implemented through alternative embodiments within the scope of the present invention.

What is claimed is:

1. A computer-readable medium whose contents cause a visual modeling tool to perform interactively with the display of a visual multi-level decision tree model in successive decision levels beginning at an initial decision level, by performing the steps of:

displaying a decision level of the visual multi-level decision tree model, the decision level including at least one visual object, each visual object being linked to at least one other visual object to form a multi-level decision tree and decision levels with more than one visual object representing a choice between the visual objects;

generating a plurality of browser buttons at each decision level for providing information concerning a choice of a visual object;

responding to a selection of a browser button to browse considerations, questions, and answers based on the browser button selected as an aid in making a choice of a visual object;

responding to a selection a visual object by causing the visual modeling tool to advance a current decision level to a next decision level for non-final visual objects; and continuing with the steps of displaying a decision level, generating a plurality of browser buttons, responding to a selection of a browser button, and responding to a selection of a visual object until a final visual object is selected whereby a plurality of visual objects, each of the visual objects directly depend from visual objects which have been selected by a user, form a visual multi-level decision tree model that is displayed level by level in succession based on user decisions.

2. A computer implemented visual modeling tool comprising:

a user interface including a display for displaying information from the visual modeling tool and interacting with the visual modeling tool;

the visual modeling tool operating to interactively and gradually display successive decision levels of a visual multi-level decision tree, each decision level including at least one visual object, each visual object being linked to at least one other visual object to form a multi-level decision tree, and for decision levels with more than one visual object selection of one visual object represents a choice between the visual objects;

the visual modeling tool generating at least one browser button at a decision level with more than one visual object for providing information concerning choosing between said more than one visual object; and the user interface operating to control the display so that as a user selects visual objects, the display displays only visual objects which depend from visual objects which have been selected;

wherein the browser buttons at each decision level further comprises a browser button to browse considerations concerning a selection of a visual object.

3. A computer implemented visual modeling tool comprising:

a user interface including a display for displaying information from the visual modeling tool and interacting with the visual modeling tool;

the visual modeling tool operating to interactively and gradually display successive decision levels of a visual multi-level decision tree, each decision level including at least one visual object, each visual object being linked to at least one other visual object to form a multi-level decision tree, and for decision levels with more than one visual object selection of one visual object represents a choice between the visual objects;

the visual modeling tool generating at least one browser button at a decision level with more than one visual object for providing information concerning choosing between said more than one visual object; and the user interface operating to control the display so that as a user selects visual objects, the display displays only visual objects which depend from visual objects which have been selected;

wherein the browser buttons at each decision level further comprises a browser button to browse questions concerning a selection of a visual object.

4. A computer implemented visual modeling tool comprising:

a user interface including a display for displaying information from the visual modeling tool and interacting with the visual modeling tool;

the visual modeling tool operating to interactively and gradually display successive decision levels of a visual multi-level decision tree, each decision level including at least one visual object, each visual object being linked to at least one other visual object to form a multi-level decision tree, and for decision levels with more than one visual object selection of one visual object represents a choice between the visual objects;

the visual modeling tool generating at least one browser button at a decision level with more than one visual object for providing information concerning choosing between said more than one visual object; and the user interface operating to control the display so that as a user selects visual objects, the display displays only visual objects which depend from visual objects which have been selected;

wherein the browser buttons at each decision level further comprises a browser button to browse answers put forward by other users to questions concerning a selection of a visual object.

5. A computer implemented visual modeling method for interactively displaying in succession decision levels of a visual multi-level decision tree, the visual modeling method comprising:

displaying a decision level of the visual multi-level decision tree model, the decision level including at least one visual object, each visual object being linked to at least one other visual object to form a multi-level decision tree, and decision levels with more than one visual object representing a choice between the visual objects;

generating a plurality of browser buttons at each decision level for providing information concerning a choice of a visual object;

responding to a selection of a browser button by displaying information concerning a choice of a visual object;

responding to a selection of a visual object by causing a current decision level to advance to a next decision level for non-final visual objects; and continuing with the steps of displaying a decision level, generating a plurality of browser buttons, responding to a selection of a browser button, responding to a selection of a visual object, until a final visual object is selected whereby a plurality of visual objects, each of the visual objects directly depend from visual objects which have been selected by a user, form a visual multi-level decision tree model that is displayed level by level in succession based on user decisions;

wherein the browser buttons are internet browser buttons further comprising:

a consideration browser button with an internet link to access consideration information as an aid in making a selection;

a question browser button with an internet link to access questions pertinent to making a selection; and an answer browser button with an internet link to user answers to the questions pertinent to making a selection.

* * * * *